US006464243B2

(12) United States Patent
Roche

(10) Patent No.: US 6,464,243 B2
(45) Date of Patent: Oct. 15, 2002

(54) WHEEL CHAIR

(76) Inventor: James Roche, Dundalk Road, Castleblaney, County Monaghan (IE)

( * ) Notice: Subject to any disclaimer, the term of this patent is extended or adjusted under 35 U.S.C. 154(b) by 156 days.

(21) Appl. No.: 09/767,553

(22) Filed: Jan. 23, 2001

(65) Prior Publication Data

US 2001/0008335 A1 Jul. 19, 2001

Related U.S. Application Data

(63) Continuation of application No. 09/284,497, filed as application No. PCT/IE97/00066 on Oct. 15, 1997, now abandoned.

(30) Foreign Application Priority Data

Oct. 15, 1996 (IE) .......... S960724
Apr. 16, 1997 (IE) .......... S970284

(51) Int. Cl.[7] .......... B62B 3/02

(52) U.S. Cl. .......... 280/650; 280/250.1; 280/304.1; 280/641; 280/642

(58) Field of Search .......... 280/250.1, 642, 280/650, 641, 304.1

(56) References Cited

U.S. PATENT DOCUMENTS

| | | | | | |
|---|---|---|---|---|---|
| 3,679,257 | A | * | 7/1972 | Jacuzzi et al. | 297/72 |
| 4,607,860 | A | * | 8/1986 | Vogel | 280/650 |
| 4,650,201 | A | * | 3/1987 | Hartwell | 280/242 |
| 4,684,149 | A | * | 8/1987 | Meyer | 280/650 |
| 4,736,960 | A | * | 4/1988 | Batty et al. | 280/42 |
| 4,887,826 | A | * | 12/1989 | Kantner | 280/250.1 |
| 5,560,635 | A | * | 10/1996 | Roy | 280/642 |
| 5,593,173 | A | * | 1/1997 | Williamson | 280/642 |

* cited by examiner

*Primary Examiner*—Brian L. Johnson
*Assistant Examiner*—Deanna Draper
(74) *Attorney, Agent, or Firm*—Baker, Donelson, Bearman & Caldwell

(57) ABSTRACT

A wheelchair (1) has a seat support (5) which has a pair of longitudinal bars (1) which extend downwardly at the front. The bars (10) are connected to a backrest support (6) which pivots via a triangular plate (25) to a collapsed position at which it overlies the seat support (5). The wheelchair (1) also has a lower leg support (7) which pivots about pivot joints (5) to fold up underneath the seat support (5) to collapse in a very compact and simple manner.

13 Claims, 6 Drawing Sheets

WHEEL CHAIR

REFERENCE TO RELATED APPLICATION

This is a continuation of application Ser. No. 09/284,497 filed Apr. 14, 1999 now abandoned which was a nationalization of PCT application Ser. No. PCT/IE97/00066 filed Oct. 15, 1997.

TECHNICAL FIELD

This invention relates to a wheelchair, and particularly to a collapsible wheelchair.

BACKGROUND OF THE INVENTION

Collapsible wheelchairs have been provided for some time, the objective being to allow them to collapse in a simple and compact manner so that they can be easily stored and transported, for example, by loading into the boot of a car.

One known collapsing arrangement comprises a scissors-type hinge between the wheels which allows the chair to be collapsed by pushing the sides of the chair towards each other. The wheels may or may not be removable. In this arrangement, the seat is generally flexible so that it folds down as the sides are pushed towards each other. While this arrangement is usually quite simple to operate, it suffers from the disadvantage of the chair not being particularly compact when collapsed. Also, the seat is often not particularly comfortable because it is of a flexible material to allow folding as the chair is collapsed. A still further disadvantage is that because the hinging mechanism is at the core of the chair structure it reduces structural strength, particularly in the transverse direction. Further, over time play in the structure can arise due to wear.

Alternatively, as described in Soviet Union Patent Specification No. SU1814547, it is known to provide a collapsing arrangement whereby the backrest support folds down over the seat. However, such chairs are still quite bulky when collapsed and the arrangement is of limited benefit.

Finally, a general problem with existing collapsible wheelchairs is that they are quite heavy, and thus difficult to lift when collapsed.

The invention is therefore directed towards providing a wheelchair which is collapsible in a manner whereby the chair is very compact when collapsed.

Another objective is that the chair has a high structural strength.

A further objective is that the chair is relatively lightweight.

SUMMARY OF THE INVENTION AND PREFERRED EMBODIMENTS

According to the invention, there is provided a collapsible wheelchair comprising a seat support, a backrest support, a lower leg support, and wheels on an axle, characterized in that, the backrest support and the lower leg support are each movable from an operative position to a collapsed position substantially parallel to the seat support.

By allowing the backrest support and the lower leg support to lie substantially parallel to the seat support, the wheelchair collapses in a very compact manner. There is no need to introduce a hinge between the wheels and there is therefore improved structural integrity.

In one embodiment, the backrest support and the lower leg support are movable by pivoting about the seat support. Pivoting is a very simple way of collapsing the chair, and pivot joints are also generally very reliable and durable.

In one embodiment, the lower leg support is movable by pivoting about a lower leg support pivot joint to lie underneath the seat support. This is a very simple and compact arrangement.

Preferably, the seat support comprises a front portion which extends downwardly and supports the lower leg support pivot joint at a lower end thereof. This is an important aspect of the invention as the front portion provides a large degree of strength and structural integrity for the front part of the chair, and it also serves the purpose of supporting a pivot joint for the lower leg support so that the lower leg support folds neatly up underneath the seat support in a compact manner. In this latter embodiment, the seat support front portion comprises a pair of spaced-apart longitudinal tubes extending downwardly.

In one embodiment, the lower leg support is configured to lie between the lower leg support pivot joint and the wheel axle or camber bar. This allows the lower leg support to rest between the seat support front portion and the wheel axle in a compact and convenient manner.

In one embodiment, the lower leg support pivot joint comprises a pivot pin between the lower leg support and the seat support, and a sleeve which is slidable between a locked position covering the pin and preventing lower leg support rotation and an unlocked position at which the pin is exposed and the lower leg support is free to pivot about the pin. The use of a slidable sleeve is a very inexpensive and simple way of locking the joint in a manner whereby the chair withstands the usual day-to-day forces transmitted from the front of the wheelchair.

Preferably, the sleeve is knurled for ease of operation. This allows a user to easily slide the sleeve between the locked and unlocked positions.

Preferably, the sleeve is held in the locked position by a bayonet fixture. This is a well-known and simple fixture.

Preferably, the lower leg support comprises a U-shaped bar, the lower part of which is a footrest. This is a simple construction which provides excellent strength in a simple and lightweight manner.

In one embodiment, the lower leg support further comprises a transverse brace extending between uprights. Such a brace provides a large degree of strength for the lower leg support, particularly to prevent it from twisting. Again, the brace does not add much weight or complexity to the wheelchair.

In one embodiment, the U-shaped bar uprights are mounted within a pair of outer sleeves for telescoping height adjustment. This is a very simple way of providing adjustment for the footrest.

Preferably, the seat support comprises a brace extending transversely between a pair of side members, and the lower leg support brace is offset with respect to the seat support brace when the chair is collapsed. These braces can allow a compact arrangement whereby they provide support for the chair when collapsed so that it is not easily damaged.

In one embodiment, the wheelchair further comprises a fastener to interconnect the lower leg support and the seat support in the collapsed position to prevent inadvertent opening. This is a simple way of preventing inadvertent opening. The fastener can, for example, be connected between the braces on the seat and lower leg supports.

Preferably, the wheel axle is mounted on a adjustable axle support for height adjustment. This allows excellent versatility.

In one embodiment, the axle support comprises a pair of uprights interconnected by a transverse bar connected to the wheel axle. This arrangement provides high strength in a simple manner.

In one embodiment, the axle is adjustable in the longitudinal direction on the axle support. This also provides versatility in a simple manner.

In one embodiment, the uprights are mounted for telescoping height adjustment. This is a simple way of allowing height adjustment.

In one embodiment, the wheelchair further comprises a longitudinal brace extending between the lower leg support and the seat support, the longitudinal brace being removable. Such a brace adds additional structural strength, which, for example, is desirable in some applications such as sports use.

In one embodiment, the backrest support is connected to the seat support by a pivot joint. Preferably, the backrest support comprises a lock having a pair of locking pins biased into a locked position and releasible by operation of an actuator. This is a very simple release arrangement.

In one embodiment, the backrest support comprises at least one plate extending in the longitudinal direction, each plate being connected to the seat support by a pivot joint and by a lock positioned rearwardly of the pivot joint and being secured to a backrest support main body between the joint and the lock. These plates provide high strength connecting the backrest and seat supports together, and allow the backrest support to be folded down to overlie the cushion of the seat support.

BRIEF DESCRIPTION OF THE DRAWING

The invention will be more clearly understood from the following description of some embodiments thereof, given by way of example only with reference the accompanying drawings in which.

DETAILED DESCRIPTION

Figure 1:
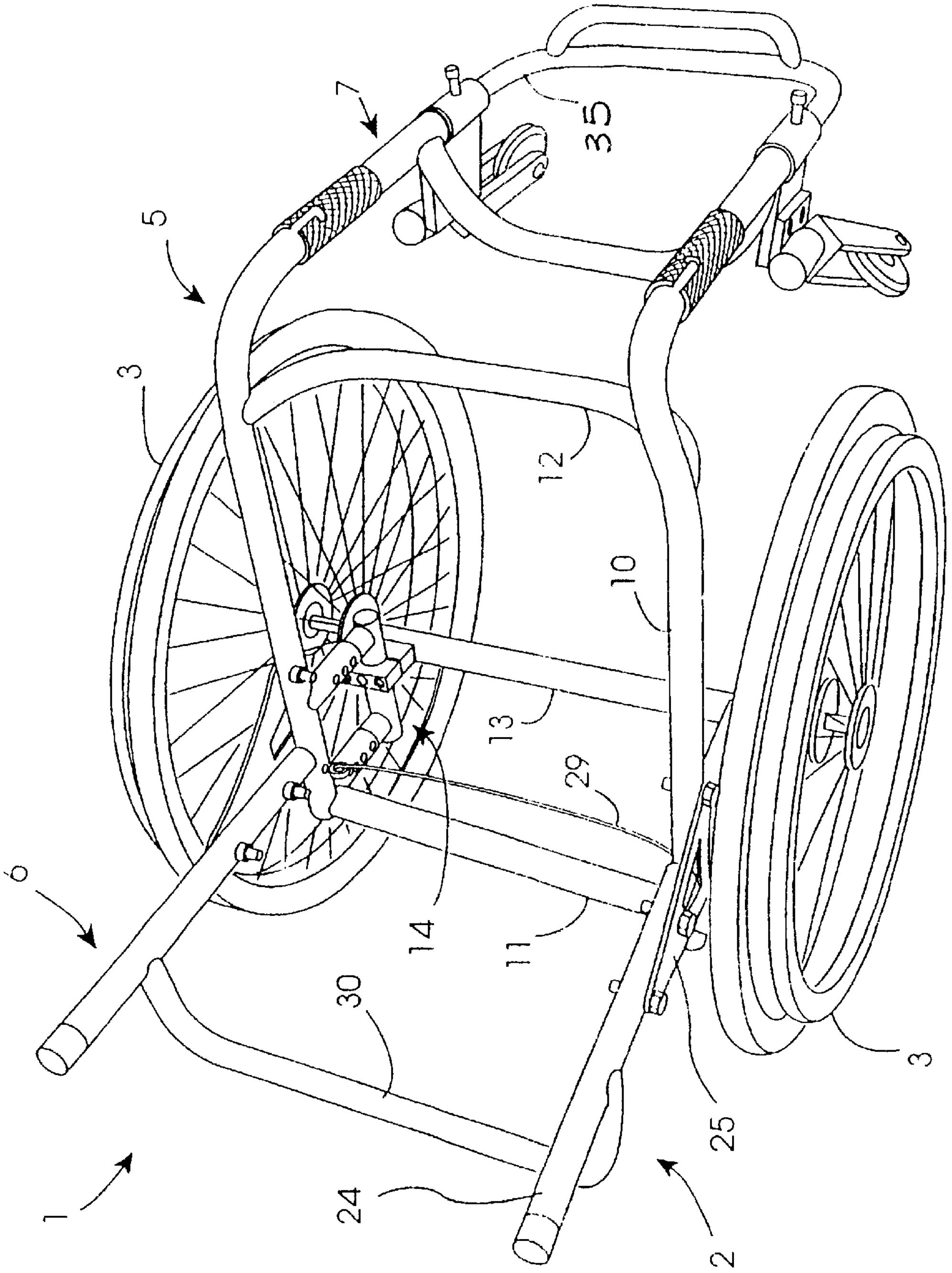
FIG. 1 is a perspective view from above of a wheelchair of the invention.

Referring to the drawings, there is shown a wheelchair 1. The wheelchair 1 has a frame 2 to which is connected a pair of wheels 3. The frame 2 comprises a seat support 5, a backrest support 6, and a lower leg support 7. The seat support 5 and the backrest support 6 support seat and backrest cushions, which are not shown in the drawings for clarity. The lower leg support 7 is connected to the seat support 5 by a pair of joints 50 and the backrest support 6 is connected to the sat support 5 by a pair of joints 26.

The seat support 5 comprises a pair of longitudinal bars 10 which are interconnected by a rear brace 11, a front brace 12, and an axle 13. The wheels 3 are connected to an axle 13 by quick release couplings for ease of removal.

Briefly, the chair 1 collapses as shown in FIGS. 2*a*, 2*b*, and 2*c*. There are no joints which operate about a vertical axis, and so there is complete structural rigidity in the transverse direction. Also, in the longitudinal direction the seat support 5 provides rigidity. The lower leg support 7 pivots about the joints 50 as shown in FIG. 2*b*. The joints 50 are at the end of a front portion of the seat support 5 which extends downwardly. Also, the lower leg support 7 is configured to have a length which allows it to fit neatly between the joints 50 and the axle 13. The fact that the joints 50 are spaced-apart from the main part of the seat support allows the lower leg support 7 to lie substantially parallel to the seat support 5. Also, the backrest support 6 has a pair of plates 25 which support the main part of the backrest support rearwardly of the pivot pins 26. This allows the backrest support to lie substantially parallel to the seat support in a neat and compact manner, as shown in FIG. 2*c*.

Figure 3:
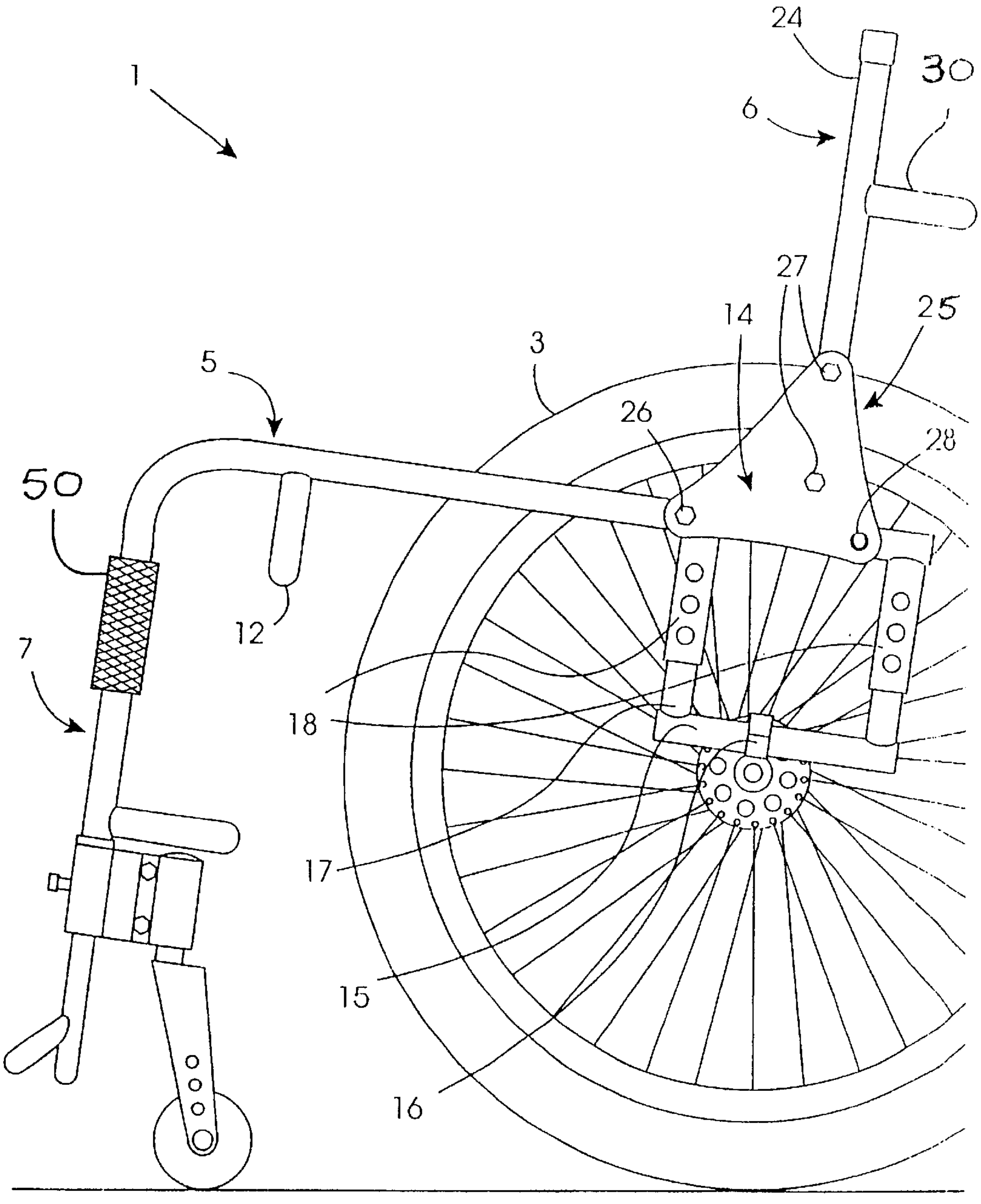
FIG. 3 is a side view of the wheelchair.

In more detail, and referring particularly to FIG. 3, the axle 13 is mounted on a pair of axle supports 14. Each axle support 14 has a lower horizontal support bar 15 which supports an axle clamp 16. The clamps 16 are movable between front and rear positions for versatility and balance adjustment. The lower support bar 15 is connected to a pair of uprights 17 which engage within telescopic outer sleeves 18 which have apertures for setting height using adjustment screws.

Referring particularly to FIGS. 1 and 3, the backrest support 6 comprises a pair of uprights 24 which are fixed to the triangular plates 25 by a pair of bolts 27. The plates 25 are pivotally connected to the seat support bar 10 by pivot pins 26. The plates 25 are locked in the operative position by a pair of releasible locking pins 28. The locking pins 28 are spring-loaded and may be disengaged by pulling an actuator string 29, shown in FIG. 1. The backrest support 6 also comprises a transverse brace 30.

Referring particularly to FIGS. 1, 3 and 4, the lower leg support 7 comprises a U-shaped bar 35 within a pair of outer tubes 34. The lower part of the bar 35 acts as a footrest. A forward footrest 36 is also connected to the bar 35 to provide additional feet support. A pair of castor sockets 37 is connected to the bars 34 and are each held in position by a fixing bolt 38 which prevents rotation and by a shoulder on the bar 34 which prevents upward movement. The socket 37 is connected to a castor suspension bar 39, which in turn supports a castor 40. The suspension bar 39 is rotatable within the socket 37. An important aspect of the lower leg support is that a large degree of structural strength is provided by a transverse brace 45 which extends between the uprights of the U-shaped bars 34. This withstands forces exerted at individual castors 40, particularly twisting or rotational forces.

As stated above, the lower leg support 7 is connected to the seat support 5 by a pair of pivot joints 50. The front elbows of the longitudinal bars 10 are turned inwardly to reduce width. Each pivot joint 50 comprises a knurled sleeve 51 which has a cutout to form a bayonet fixture with a spigot 52 on the respective seat support longitudinal bar 10. An important aspect of the seat support is that the longitudinal bars 10 extend downwardly at the front end to provide a large degree of structural strength for the seat support and the structure generally. Further, the reduced width at the front allows the lower leg support 7 to fold upwardly under the seat support in a compact manner. The pivot joint 50 also comprises an internal pivot pin 53 between the bars 34 and the longitudinal bar 10 of the seat support 5.

Figure 2:
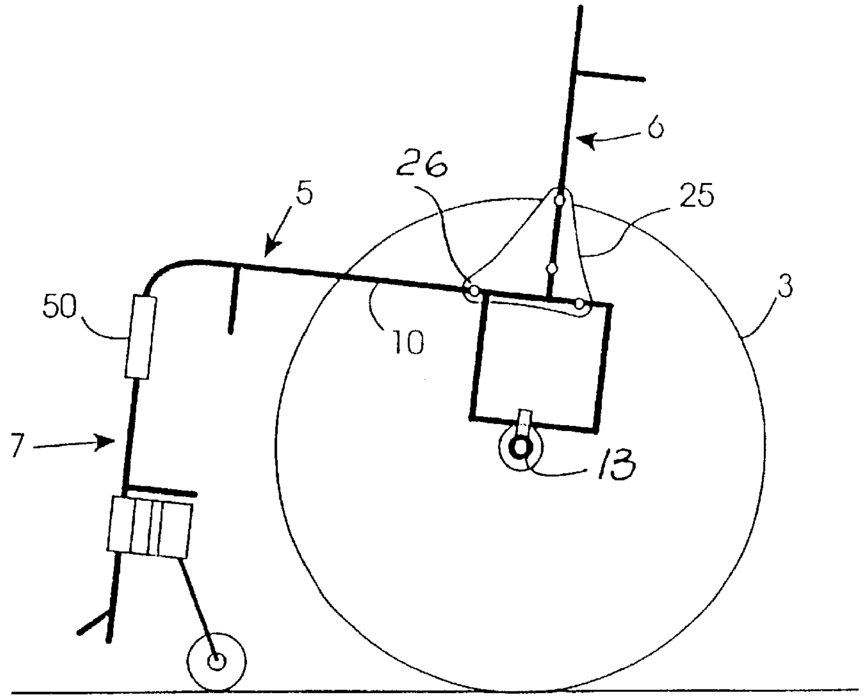
FIGS. 2*a*, 2*b* and 2*c* are diagrammatic side views illustrating the manner in which the wheelchair is collapsed.
Figure 2:
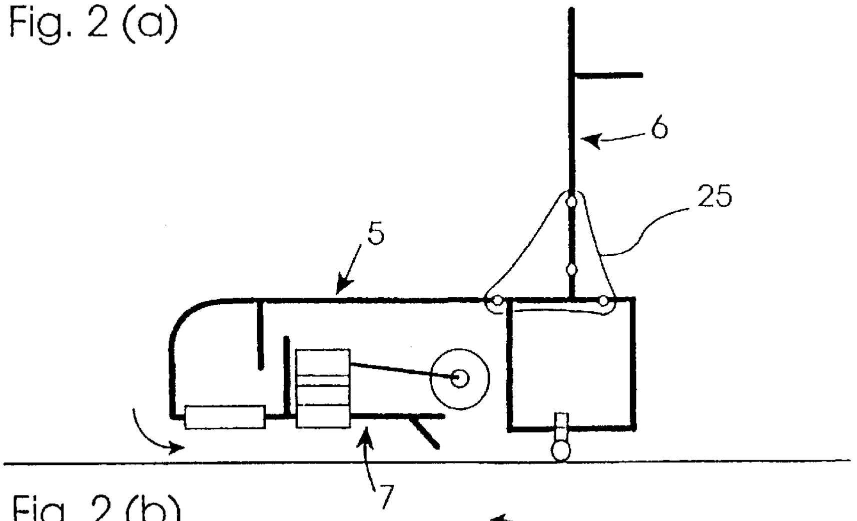
Figure 2:
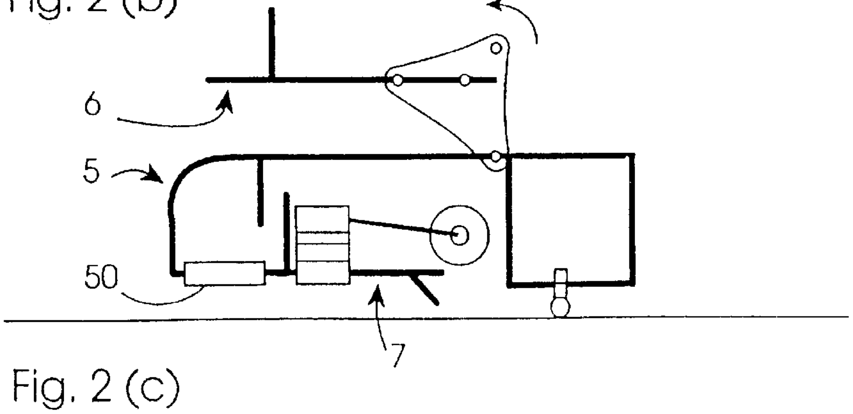
Figures 4A, 4B, 4C:
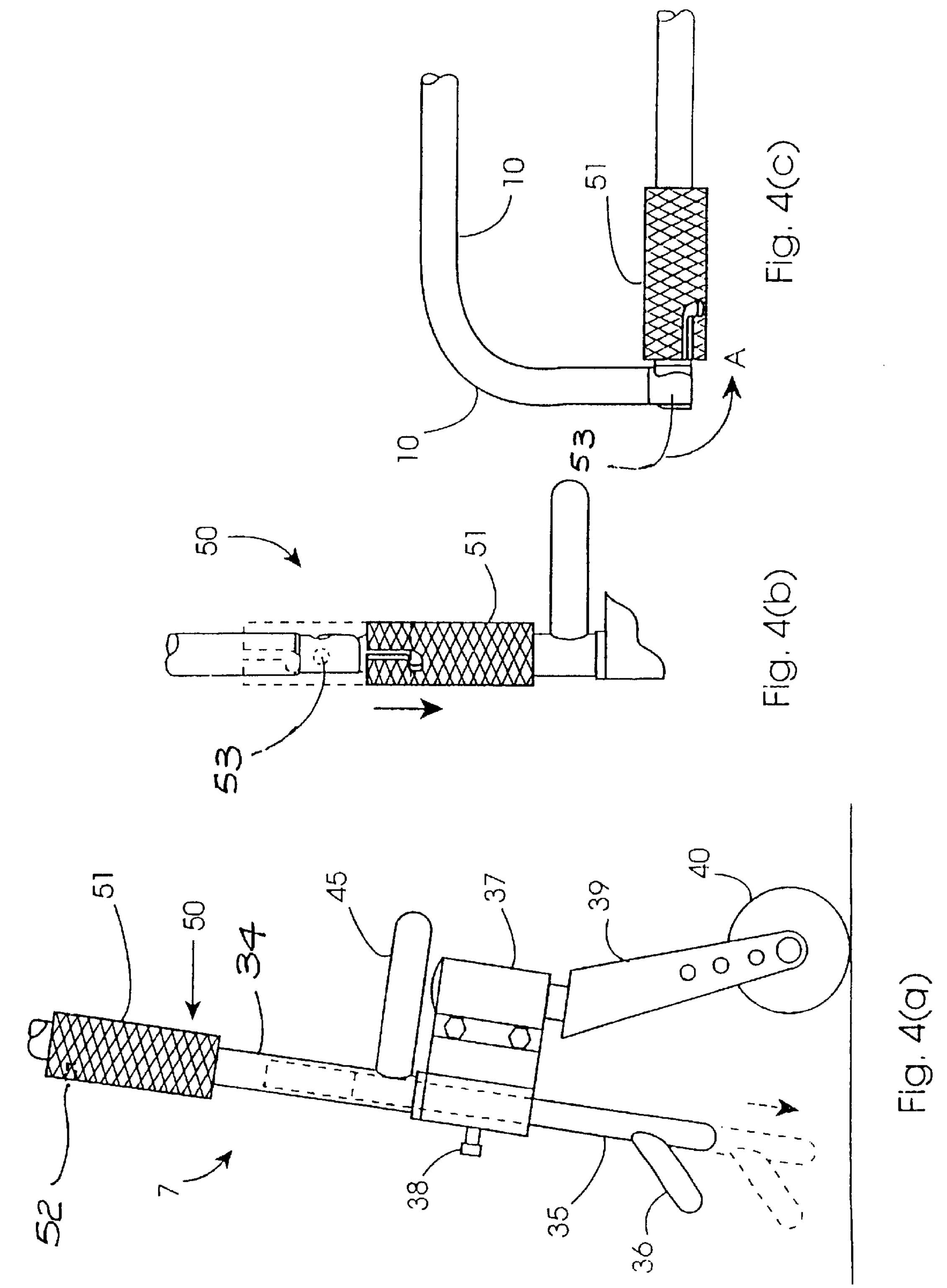
FIGS. 4*a*, 4*b* and 4*c* are side views showing folding of a lower leg support in more detail.
Figure 5:
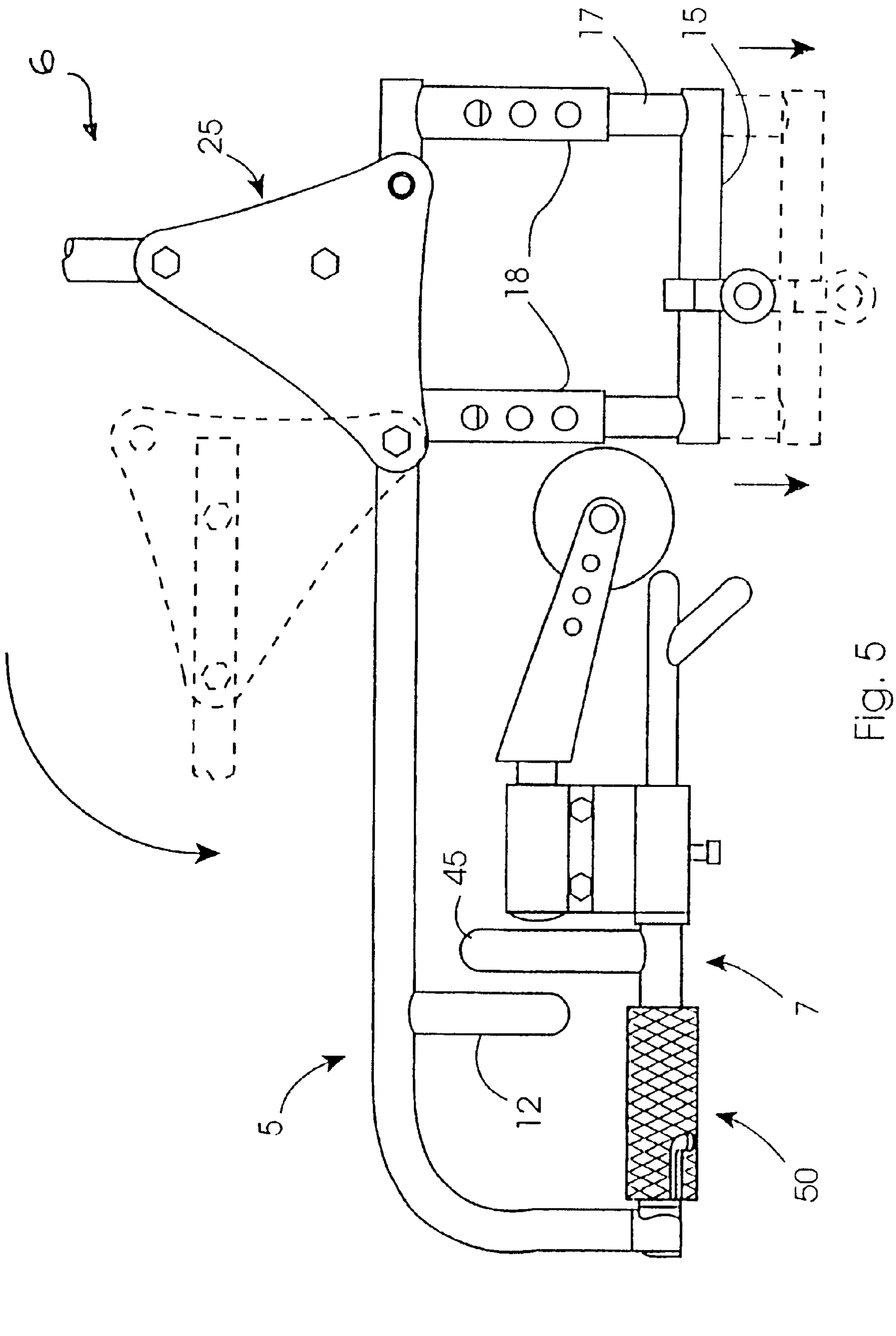
FIG. 5 is a side view showing folding of both a backrest support and a lower leg support.
Figure 6:
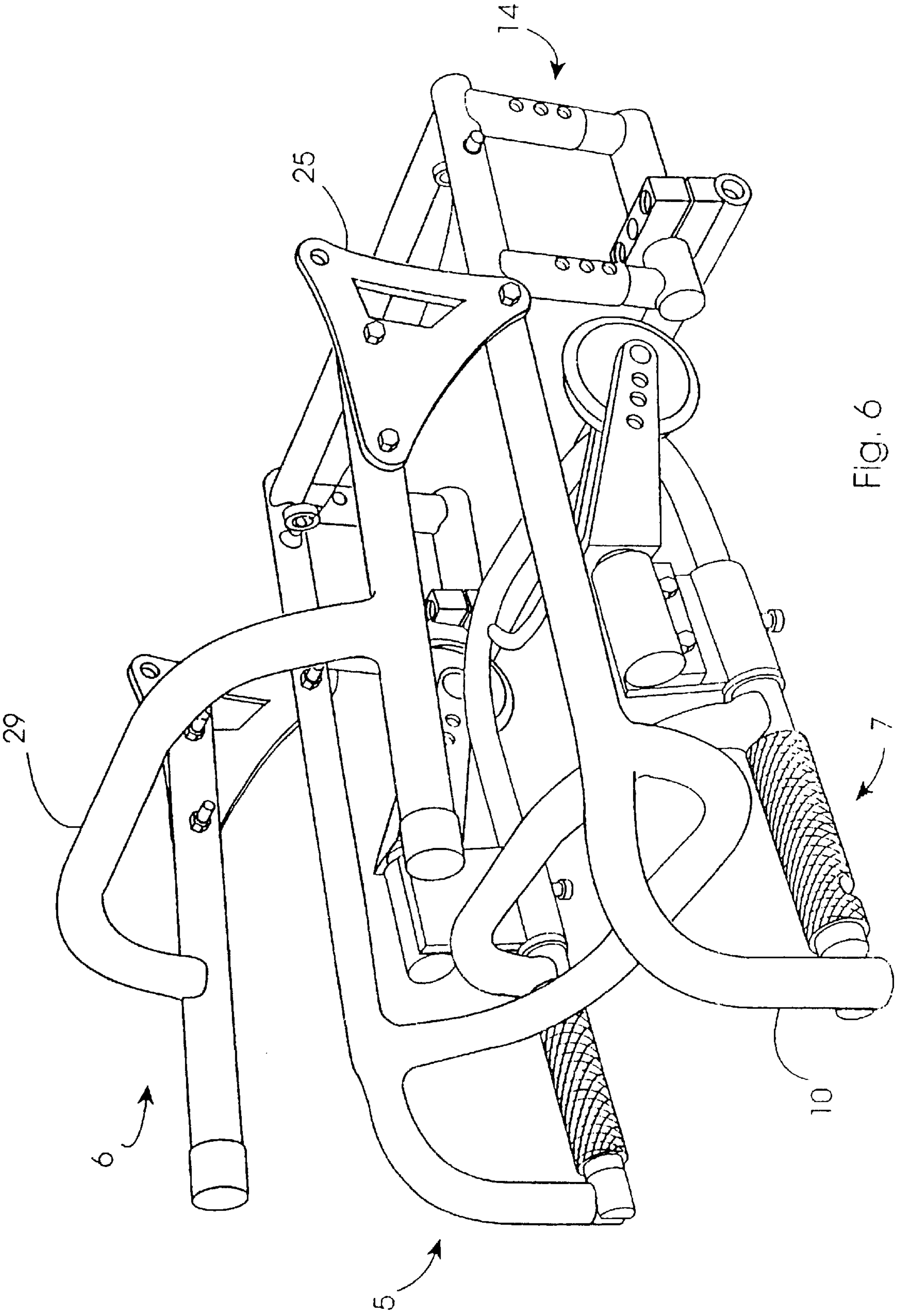
FIG. 6 is a perspective view showing the wheelchair when folded.

In operation, and referring particularly to FIGS. 2, 5 and 6, the wheelchair is used in conventional manner by a wheelchair user, with or without an assistant. To collapse the chair 1, the user or an assistant pulls the actuator 29 which releases the spring-loaded pins 28 to release the plates 25 and allow them to pivot about the seat support 5. The backrest support 6 is then pushed forward so that it overlies the seat support 5. The user or an assistant then rotates the knurled sleeves 51 to release the bayonet lock, and then slides the knurled sleeve 51 downwardly as shown in FIG. 4*a* to expose the pivot pin 52. The lower leg support 7 may then be easily folded upwardly and under the seat support 5 as shown in FIG. 4*c*. The fully folded chair is illustrated in FIG. 5.

It will be appreciated from the drawing of FIG. 6 that the chair folds in a very compact manner. The plates 25 allow the backrest support 6 to be spaced-apart from the seat support so that the cushion of the seat support is easily accommodated within the backrest support brace 29. This cushion may alternatively be removed. Further, the front ends of the longitudinal seat support bars 10 allow the lower leg support 7 to lie parallel to the set support to allow a compact collapsed position. As is clear from FIG. 6 the lower leg support is accommodated between the front portion of the longitudinal bars 10 and the axle supports 14. It is clear particularly from FIG. 5 that the seat support brace 12 and the lower leg support brace 45 are offset with respect to each other so that they together provide support for the chair when collapsed in a neat and compact folding arrangement. The wheels can be removed either before or after folding the backrest and lower leg supports. These are removed in a conventional manner using a quick-release coupling.

It will be appreciated that the chair of the invention has a large degree of structural strength, while at the same time being of simple and lightweight construction and also allowing very compact and simple collapsing. The fact that there are no joints operating about a vertical axis is very important as this provides complete rigidity in response to transverse and twisting forces. As is clear from FIG. 6, the chair is very compact when collapsed and may be easily fitted into the boot of a car. Further, collapsing is very simple to perform as it is only necessary to operate the actuator strings 29 and slide the knurled sleeves 51.

The invention is not limited to the embodiments described. For example, it is envisaged that a lower leg support pivot joint may have a sleeve which is locked by a push-button arrangement instead of a bayonet fixture, however, the bayonet fixture is particularly convenient. It is also envisaged that an internal slidable rod may provide rigidity for the joint when locked. Alternatively any other type of lockable joint providing equivalent locking strength may be used.

Because the lower leg support is effectively cantilevered to provide an open construction, it is envisaged that an additional brace arrangement may be provided. Such an arrangement may be removable so that it is used only for certain applications such as sports. In one example, such a brace may be a longitudinal brace which connects with the lower leg and seat supports. This would provide additional support for the lower leg support 7 and longitudinal support generally. Such a brace may be connected by quick-release coupling. The brace may be telescopic for length adjustment. In one embodiment, the brace may extend between the brace 45 and axle 13, or alternatively the rear seat support brace 11. Alternatively, external struts across the elbows at the front portion of the seat support 5 may be used. Another way of providing increased longitudinal strength is to use a particularly strong tubing at the front portion of the seat support, such as a compound double-walled tube.

It is also envisaged that the lower leg support and/or the backrest support may be removable from the sat support such as by sliding out from telescopic engagement.

What is claimed is:

1. A collapsible wheelchair comprising a seat support, a backrest support, a lower leg support at right angles to the seat support and wheels on an axle, the backrest support and the lower leg support being movable from an operative position to a collapsed position substantially parallel to the seat support by pivoting about the seat support and about a pair of lower leg support pivot joints to lie underneath the seat support; the seat support comprising two front portions, each of which extend downwardly and support at a lower end thereof one of the lower leg support pivot joints, each of which comprises a pivot pin between one of the lower leg supports and the seat support, and a sleeve which is slidable between a locked position covering the pin and preventing lower leg support rotation and an unlocked position at which the pin is exposed and the lower leg support is free to pivot about the pin, with the two sleeves in the operative position of the wheelchair being at right angles to the seat support and the sleeves in the collapsed position of the wheelchair being parallel to the seat support.

2. A wheelchair as claimed in claim 1 further comprising a longitudinal brace extending between the lower leg support and the seat support, the longitudinal brace being removable.

3. A wheelchair as claimed in claim 1, wherein the sleeve is knurled for ease of operation.

4. A wheelchair as claimed in claim 1, wherein the lower leg support comprises a U-shaped bar, the lower part of which is a footrest.

5. A wheelchair as claimed in claim 4, wherein the lower leg support further comprises a transverse brace extending between uprights.

6. A wheelchair as claimed in claim 4, wherein the U-shaped bar uprights are mounted within a pair of outer sleeves for telescoping height adjustment.

7. A wheelchair as claimed in claim 1, wherein the seat support comprises a brace extending transversely between a pair of side members, and wherein the lower leg support brace is offset with respect to the seat support brace when the chair is collapsed.

8. A wheelchair as claimed in claim 1, further comprising a fastener to interconnect the lower leg support and the seat support in the collapsed position to prevent inadvertent opening.

9. A wheelchair as claimed in claim 1, wherein the backrest support is connected to the seat support by a pivot joint.

10. A wheelchair as claimed in claim 9 wherein the backrest support comprises a lock having a pair of locking pins biased into a locked position and releasable by operation of an actuator.

11. A wheelchair as claimed in claim 9, wherein the backrest support comprises at least one plate extending in the longitudinal direction, each plate being connected to the seat support by a pivot joint and by a lock positioned rearwardly of the pivot joint and being secured to a backrest support main body between the joint and the lock.

12. A collapsible wheelchair comprising a seat support, a backrest support, a lower leg support and wheels on an axle, the backrest support and the lower leg support being movable between an operative position and a collapsed position substantially parallel to the seat support, and wherein the wheel axle is mounted on an adjustable wheel axle support for height adjustment which comprises a pair of uprights interconnected by a transverse bar connected to the wheel axle.

13. A wheelchair as claimed in claim 12 wherein the uprights are mounted for telescoping height adjustment.

* * * * *